(12) United States Patent
Kinoshita (10) Patent No.: US 8,506,281 B2
(45) Date of Patent: Aug. 13, 2013

(54) ROTATING STRUCTURE OF ROTARY MEMBER

(75) Inventor: Tadatoshi Kinoshita, Tokyo (JP)

(73) Assignee: Yourbusiness Co., Ltd., Tokyo (JP)

( * ) Notice: Subject to any disclaimer, the term of this patent is extended or adjusted under 35 U.S.C. 154(b) by 330 days.

(21) Appl. No.: 12/903,274

(22) Filed: Oct. 13, 2010

(65) Prior Publication Data

US 2011/0091597 A1    Apr. 21, 2011

(30) Foreign Application Priority Data

Oct. 16, 2009   (JP) ................................. 2009-239144

(51) Int. Cl.
    *B29C 43/04*    (2006.01)
(52) U.S. Cl.
    USPC ......................................... 425/193; 425/409
(58) Field of Classification Search
    USPC .................. 425/193, 363, 385, 394, 409, 412
    See application file for complete search history.

(56) References Cited

U.S. PATENT DOCUMENTS

| 5,770,123 | A  | * | 6/1998  | Hatakeyama et al. | ........ 425/135 |
| 6,471,501 | B1 | * | 10/2002 | Shinma et al.     | ................ 425/195 |
| 7,448,862 | B2 | * | 11/2008 | Kokubo et al.     | ............... 425/385 |

FOREIGN PATENT DOCUMENTS

| JP | 2005-249019 | 9/2005 |
| JP | 2007-283352 | 11/2007 |

* cited by examiner

*Primary Examiner* — Richard Crispino
*Assistant Examiner* — Thukhanh Nguyen
(74) *Attorney, Agent, or Firm* — Wenderoth, Lind & Ponack, L.L.P.

(57) ABSTRACT

There is provided a rotating structure of a rotary member disposed in a press molding apparatus including the rotary member; a main body; and a rotating block. The rotating block includes a convex strip to be attached to the lower portion of the rotary member and a concave strip to be attached to the main body. The convex strip includes a flat mounting portion and a convex sliding portion, and is formed with bolt holes penetrating through the mounting portion and the convex sliding portion at a plurality of positions. The concave strip includes a flat mounting portion and a concave sliding portion, and is formed with bolt holes penetrating through the mounting portion and the concave sliding portion at a plurality of positions. The convex sliding portion and the concave sliding portion are positioned at slidable positions.

16 Claims, 6 Drawing Sheets

ROTATING STRUCTURE OF ROTARY MEMBER

BACKGROUND OF THE INVENTION

1. Field of the Invention

The present invention relates to a rotating structure of a rotary member disposed in a press molding apparatus.

2. Prior Art

Figure 11:
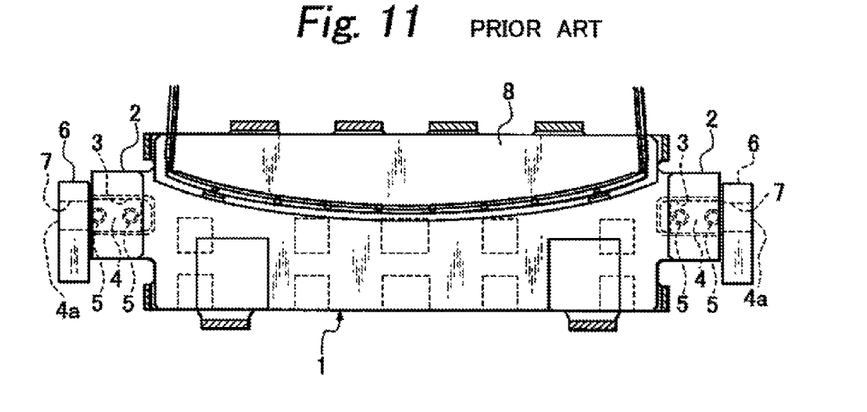
FIG. 11 is a plan view showing a rotary member in the prior art.
Figure 12:
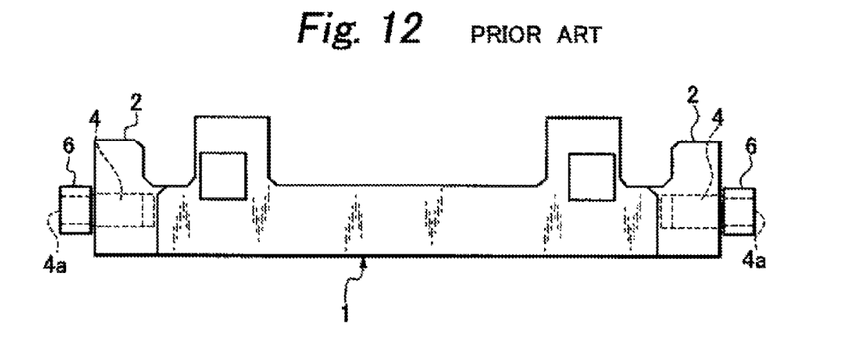
FIG. 12 is a front view showing the same rotary member.
Figure 13:
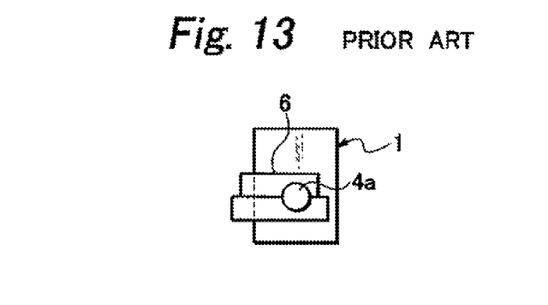
FIG. 13 is a side view showing the same rotary member.

In the prior art, as a rotary member (rotating die or swing die) to be disposed in a press molding apparatus, a configuration as shown in FIGS. 11 to 13 is known. Side portions 2 having a predetermined width are integrally provided at both end portions of a rotary member 1, and the side portions 2 each are provided with a depression 3. Supporting shafts 4 are fixedly fitted in the depressions 3 using bolts 5, and extremity portions 4a of the supporting shafts 4 are axially supported in bearing holes 7 of bearings 6 in a rotatable state, respectively. The bearings 6 are attached to a main body, not shown, and a plate member receiving portion 8 is disposed on an upper portion of the main body.

As rotary members configured as described above, for example, those disclosed in JP-A-2005-249019 (FIGS. 6 to 10) and JP-A-2007-283352 (FIGS. 1 to 5) are known.

The rotary member 1 in the prior art includes the side portions 2 having a predetermined width for attaching the supporting shafts 4 and also includes the bearings 6 configured to axially support the supporting shafts 4. Therefore, the rotary member 1 has drawbacks such that existence of spaces therefor hinders downsizing of the rotary member and that the number of components increases correspondingly and hence the manufacturing cost of the press molding apparatus is increased.

SUMMARY OF THE INVENTION

Accordingly, it is an object of the invention to provide the rotary member in which downsizing is achieved by adding a space-saving configuration instead of side portions and supporting shafts or bearings, and the manufacturing cost is lowered by reducing the number of components included therein.

In order to solve the above-described problems, there is provided a rotating structure of a rotary member having a predetermined width and being disposed in a press molding apparatus including: the rotary member; a main body positioned under the rotary member; and a rotating block to be attached to the rotary member and the main body, wherein the rotating block includes a convex strip to be attached to the lower portion of the rotary member and a concave strip to be attached to the main body, and the convex strip includes a flat mounting portion and a convex sliding portion, and is formed with bolt holes penetrating through the mounting portion and the convex sliding portion at a plurality of positions, the concave strip includes a flat mounting portion and a concave sliding portion, and is formed with bolt holes penetrating through the mounting portion and the concave sliding portion at a plurality of positions, the convex sliding portion and the concave sliding portion are positioned at slidable positions, projecting portions are provided at both ends of the rotary member in the width direction at positions lower than the axial center position of the rotary member, and arcuate shaped drop preventing holding portions corresponding to the trajectory of rotation of the rotary member are disposed for the projecting portions, so that edge portions of the projecting portions move along edge portions of the drop preventing holding portions in association with the rotation of the rotary member.

The rotating structure of the rotary member in the invention has various superior advantages as follows. The rotary member can be rotated by the existence of the rotating block. In other words, the side portion 2 and the supporting shaft 4 or the bearing 6 as in the prior art are not necessary, and the space corresponding thereto can be omitted, so that the rotary member can be downsized. Consequently, the downsizing of the press molding apparatus is achieved.

Since these components are not necessary, the number of components can be reduced, so that the manufacturing cost of the press molding apparatus can be reduced.

In addition, since the supporting shaft 4 and the bearing 6 are not provided, the center of rotation of the rotary member can be set arbitrarily, that is, design flexibility is improved.

The projecting portions are provided at both ends of the rotary member in the width direction at positions lower than the axial center position of the rotary member, and the arcuate shaped drop preventing holding portions corresponding to the trajectory of rotation of the rotary member are disposed for the projecting portions, so that edge portions of the projecting portions move along edge portions of the drop preventing holding portions in association with the rotation of the rotary member. Therefore, even when there is no space for providing the projecting portions at the axial center position, the function to prevent the drop is achieved by providing the projecting portions at lower positions.

In addition, the rotary member is prevented from being dropped even when the rotary member or entire press die is inverted.

DETAILED DESCRIPTION OF THE PREFERRED EMBODIMENTS

Referring now to the drawings, an embodiment of the invention will be described.

Figure 1:
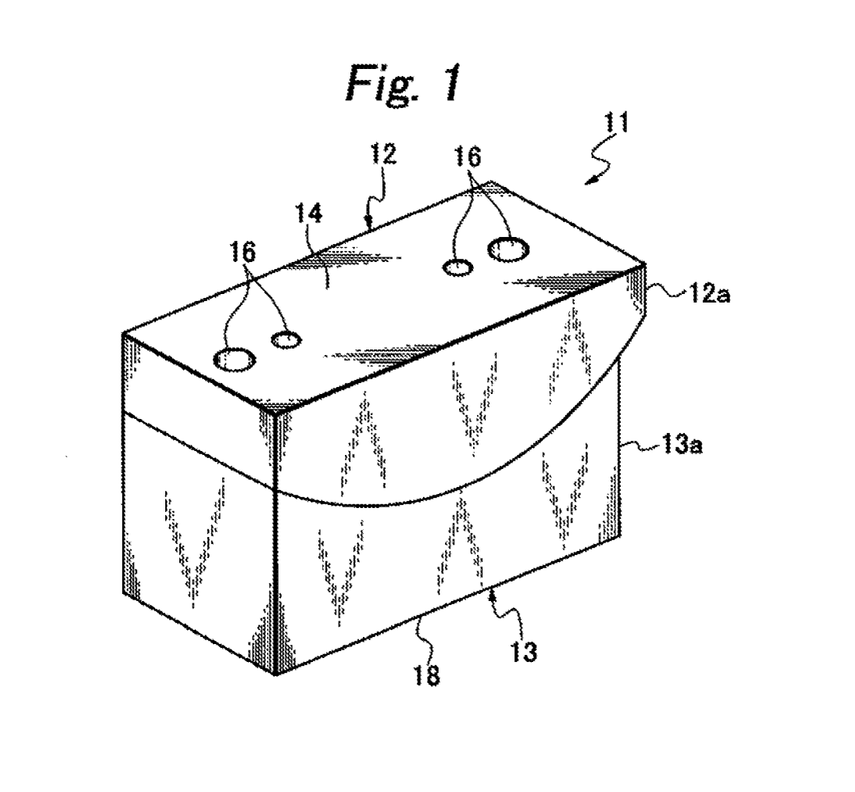
FIG. 1 is a perspective view showing a rotating block in a rotating structure of a rotary member according to the invention.

In FIG. 1, reference numeral 11 designates a rotating block of a rotary member. The rotating block 11 is formed of a metallic material, and includes a pair of strips including a convex strip 12 and a concave strip 13.

Figure 2:
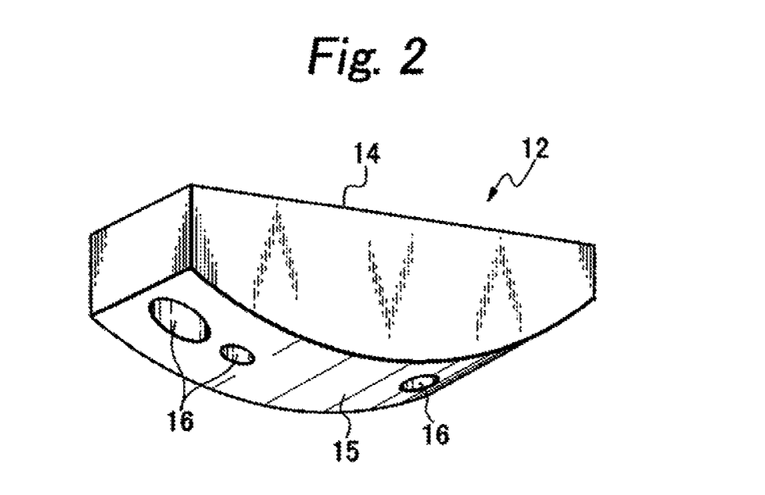
FIG. 2 is a perspective view showing a convex strip of the rotating block.

As shown in FIG. 2, the convex strip 12 is formed with a flat mounting portion 14 on an upper portion thereof and a convex sliding portion 15 formed into a convex shape is formed on a lower portion thereof. Bolt holes 16 are formed at a plurality of positions so as to penetrate through the convex strip 12 from the mounting portion 14 to the convex sliding portion 15.

Figure 3:
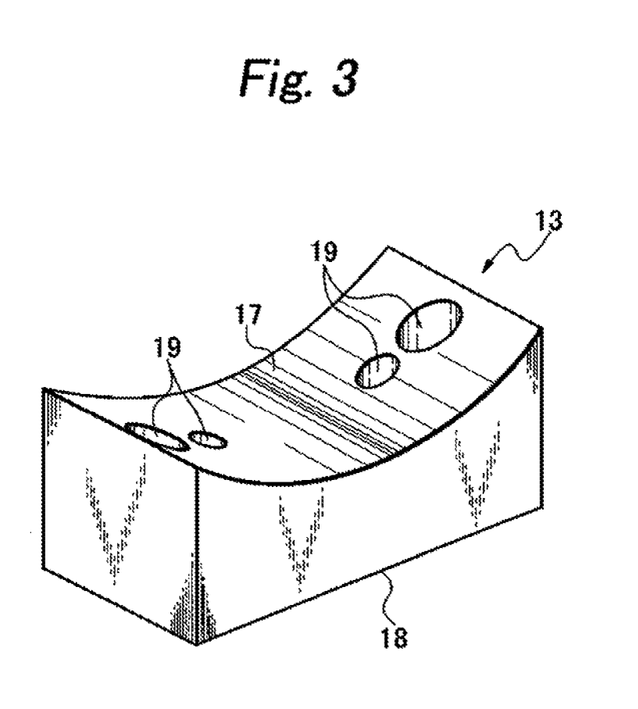
FIG. 3 is a perspective view showing a concave strip of the rotating block.

One side portion 12a of the convex strip 12 is formed so as to project outward from one side portion 13a of the concave strip 13. This provides stabilization of sliding movement by preventing a sliding surface between the rotating block 11 and the concave strip 13 from being reduced even when the end of the sliding portion of the rotating block 11 projects outward due to the rotation of the rotating block 11. However, the one side portion 12a does not necessarily have to be formed long, and may have the same length as the side portion 13a.

The concave strip 13 is formed with a concave-shaped concave sliding portion 17 on an upper portion thereof as shown in FIG. 3 and a flat mounting portion 18 is formed on a lower portion thereof. As shown in FIGS. 2 and 3, the convex and concave sliding portions have cylindrical convex and concave surfaces, respectively. Bolt holes 19 are formed at a plurality of positions so as to penetrate through the concave strip 13 from the concave sliding portion 17 to the mounting portion 18.

The rotating block 11 configured in this manner is arranged so as to be slidable by bringing the convex sliding portion 15 and the concave sliding portion 17 into abutment with each other.

The rotating block 11 configured as described above is attached to a rotary member 22 disposed in a press molding apparatus 21, described later, by securing the mounting portion 14 of the convex strip 12 (or the mounting portion 18 of the concave strip 13) thereto using a bolt securing device. Also, the mounting portion 18 of the concave strip 13 (or the mounting portion 14 of the convex strip 12) is attached to a main body 23 located on the lower portion of the rotary member 22 with the bolt securing device. Accordingly, the convex sliding portion 15 and the concave sliding portion 17 are arranged in a slidable state by being in abutment with each other.

Figure 4:
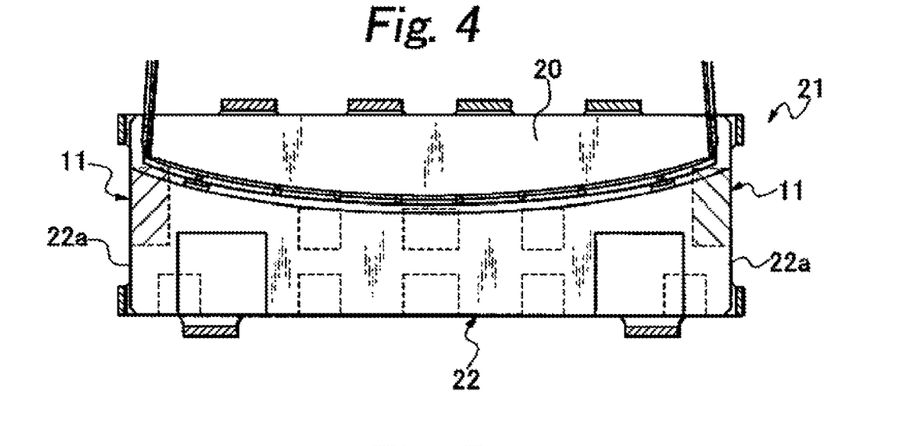
FIG. 4 is a plan view showing the rotating structure of the rotary member.
Figure 5:
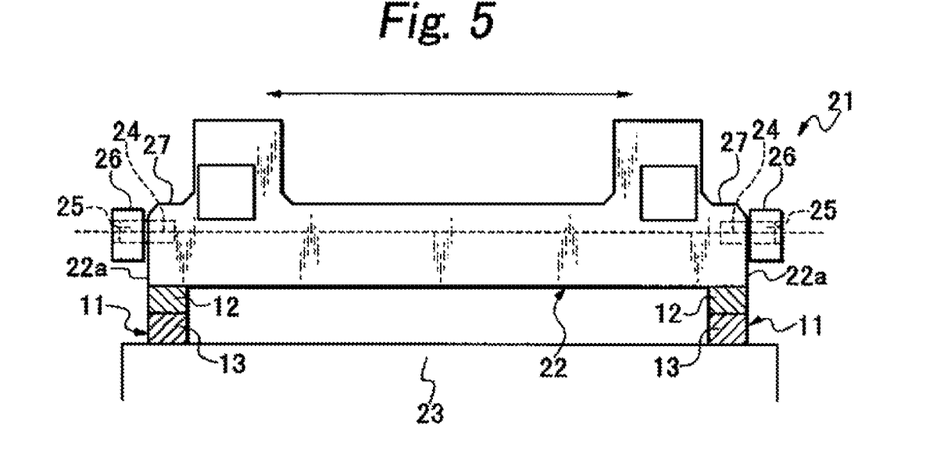
FIG. 5 is a front view showing the rotating structure of the rotary member.
Figure 6:
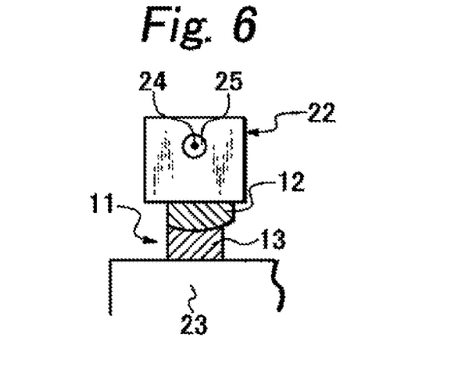
FIG. 6 is a side view showing the rotating structure of the rotary member.

Subsequently, a rotating structure of the rotary member 22 (rotating die or swing die) having the rotating block 11 disposed thereon as described above will be described. First of all, FIGS. 4 to 6 schematically show part of the press molding apparatus 21, and illustrate the rotating structure of the rotary member 22 disposed in the press molding apparatus 21.

The press molding apparatus 21 includes the rotary member 22 configured to rotate to process a plate member (not shown) as an object to be machined, the main body 23 positioned under the rotary member 22, and an upper die (not shown) corresponding to the main body 23, and the rotating block 11 is attached to the rotary member 22 and the main body 23. Reference numeral 20 in FIG. 4 designates a plate member receiving portion where the plate member is to be set.

Figure 7:
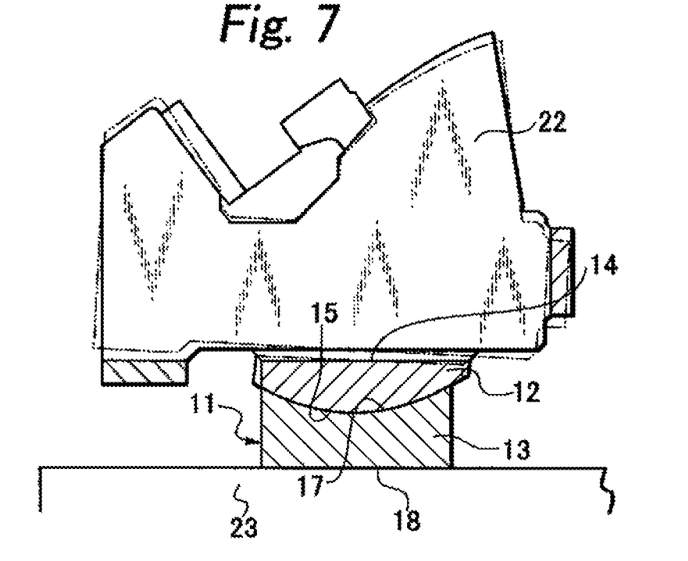
FIG. 7 is a side view showing a first mounting mode of the rotating block.

Subsequently, a first mounting mode of the rotating block 11 will be described. As shown in FIG. 7, the mounting portion 14 of the convex strip 12 is attached to the lower portion of the rotary member 22 using the bolt securing device. The mounting portion 18 of the concave strip 13 is attached to the main body 23 using the bolt securing device. Accordingly, the convex sliding portion 15 and the concave sliding portion 17 are arranged in a slidable state by being in abutment with each other. In this configuration, the side portion 2 and the supporting shaft 4 or the bearing 6 in the prior art are no longer necessary, so that the rotary member 22 can be downsized in comparison with the prior art.

Figure 8:
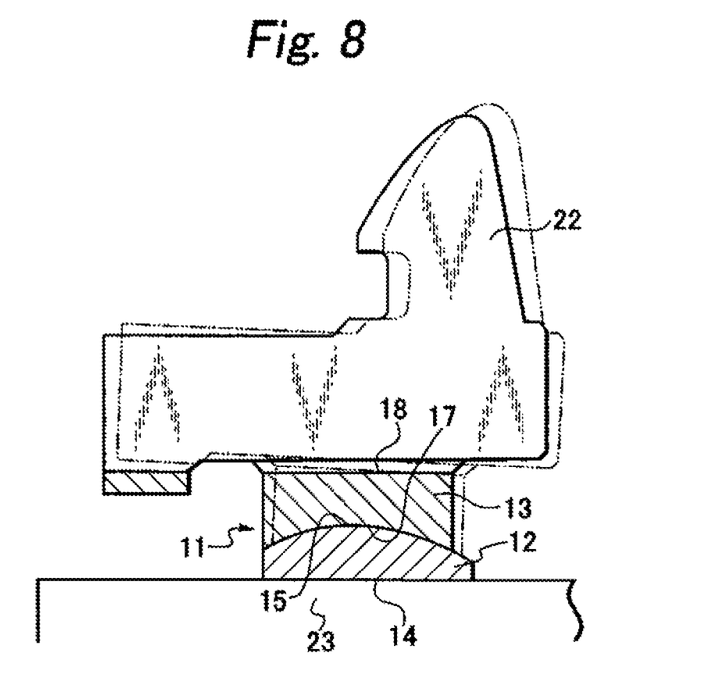
FIG. 8 is a side view showing a second mounting mode of the rotating block.

FIG. 8 shows a second mounting mode of the rotating block 11. As shown in the drawing, the mounting portion 18 of the concave strip 13 is attached to the lower portion of the rotary member 22 using the bolt securing device. The mounting portion 14 of the convex strip 12 is also attached to the main body 23 using the bolt securing device. Accordingly, the convex sliding portion 15 and the concave sliding portion 17 are arranged in a slidable state by being in abutment with each other. In this configuration, the convex sliding portion 15 can be slid stably with respect to the concave sliding portion 17, so that the rotation along a large arc is achieved.

Normally, mounting positions of the rotating blocks 11 with respect to the rotary member 22 are near both ends 22a of the rotary member 22, that is, two positions as shown in FIG. 4 and FIG. 5. However, if the rotary member 22 is smaller, the rotating block 11 may be provided only at one position, and if the rotary member 22 is larger, the rotating blocks 11 may be provided at three or more positions.

Figure 9:
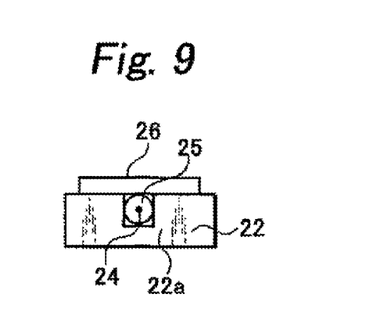
FIG. 9 is a side view showing a first mode of a drop preventing mechanism of the rotary member.

Subsequently, a first mode of a drop preventing mechanism of the rotary member 22 will be described. As shown in FIG. 5 and FIG. 9, the rotary member 22 is formed with rather small edge portions 27 on both ends 22a in the widthwise direction, and projecting portions 25 are provided at an axial center position 24 of the edge portion 27, that is, as is clear from FIGS. 5, 9, and 10, at the axial center position 24 as the axis of rotation of the rotary member 22. Then, drop preventing holding plates 26 are provided for the projecting portions 25. The drop preventing holding plates 26 are fixed to predetermined positions of the main body 23.

In this configuration, the rotary member 22 is prevented from being dropped even when the rotary member 22 or the entire press-die is inverted. Since the edge portions 27 are not subjected to bolt securing as in the case of the side portions 2 in the prior art, the width can remarkably be reduced.

Figure 10:
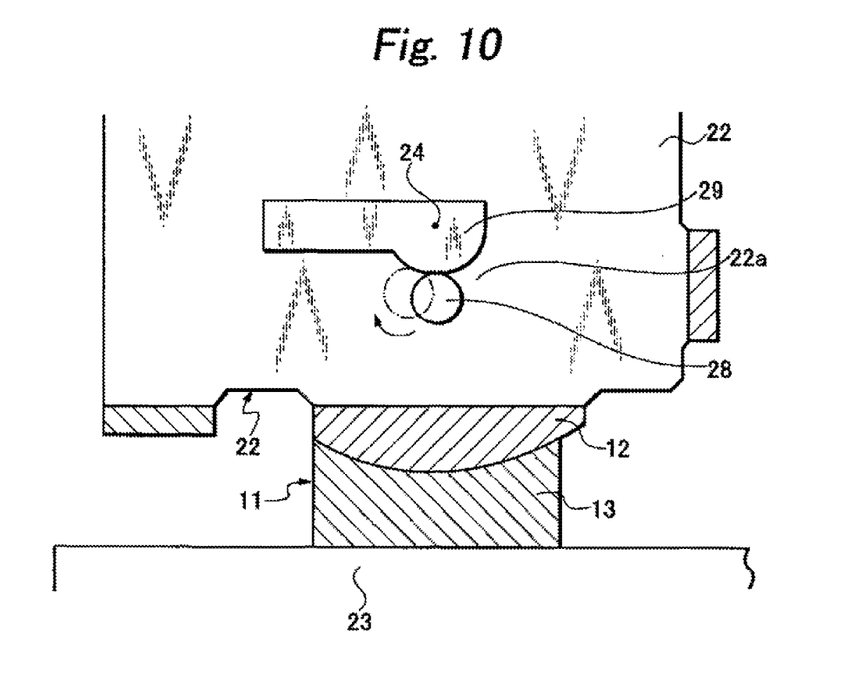
FIG. 10 is a side view showing a second mode of the drop preventing mechanism of the rotary member.

FIG. 10 shows a second mode of the drop preventing mechanism of the rotary member 22. As shown in the drawing, the rotary member 22 is formed with projecting portions 28 on both ends 22a in the widthwise direction at positions lower than the axial center position 24, that is, as is clear from FIGS. 5, 9, and 10, at positions lower than the axial center position 24 as the axis of rotation of the rotary member 22. Then, arcuate-shaped drop preventing holding portions 29 corresponding to the trajectory of rotation of the rotary member 22 are disposed for the projecting portions 28. The drop preventing holding portions 29 are fixed to predetermined positions of the main body 23. Edge portions of the projecting portions 28 move along edge portions of the drop preventing holding portions 29 in association with the sliding movement of the rotary member 22.

In this configuration, even when there is no space for providing the projecting portions 25 at the axial center position 24, the function to prevent dropping can be provided. The rotary member 22 is prevented from being dropped even when the rotary member 22 or entire press die is inverted.

The rotating structure of the rotary member 22 configured as described above is such that the rotating blocks 11 slide to allow the rotary member 22 to undergo rotary motion by pushing and pulling of the rotary member 22 with a lift pin or the like (not shown) which can be projected or retracted (see FIG. 7 and FIG. 8).

Since the supporting shaft 4 and the bearing 6 as in the prior art are not provided, the center of rotation of the rotary member 22 can be set arbitrarily, that is, design flexibility is improved. Since the side portion 2 and the supporting shaft 4 or the bearing 6 as in the prior art are not necessary, the space corresponding thereto can be omitted, so that the rotary member can be downsized. Accordingly, the downsizing of the press molding apparatus is achieved. In addition, since the components such as the supporting shaft 4 are not necessary, the number of components can be reduced, so that the manufacturing cost of the press molding apparatus can be reduced.

What is claimed is:

1. A rotating structure of a rotary member having a predetermined width and being disposed in a press molding apparatus, comprising:
    the rotary member;
    a main body positioned under the rotary member; and
    a rotating block to be attached between the rotary member and the main body to allow the rotary member to rotate relative to the main body about an axial center position,
    wherein the rotating block includes a convex strip to be attached to a lower portion of the rotary member and a concave strip to be attached to the main body,
    the convex strip includes a flat mounting portion and a convex sliding portion, and is formed with bolt holes penetrating through the mounting portion and the convex sliding portion at a plurality of positions,
    the concave strip includes a flat mounting portion and a concave sliding portion, and is formed with bolt holes penetrating through the mounting portion and the concave sliding portion at a plurality of positions,
    the convex sliding portion and the concave sliding portion are mounted to each other for slidable movement between slidable positions,
    projecting portions are mounted at both ends of the rotary member in the width direction at positions lower than the axial center position of the rotary member, and
    arcuate shaped drop preventing holding portions are mounted to the main body and disposed to engage the projecting portions, the arcuate shaped drop preventing holding portions each having an arcuate shape corresponding in shape to a trajectory of rotation of the rotary member relative to the main body so that edge portions of the projecting portions move along edge portions of the drop preventing holding portions in association with the rotation of the rotary member.

2. A rotating structure of a rotary member having a predetermined width and being disposed in a press molding apparatus, according to claim 1, wherein
    the concave sliding portion of the concave strip has a cylindrical concave shape; and
    the convex sliding portion of the convex strip has a cylindrical convex shape.

3. A rotating structure of a rotary member having a predetermined width and being disposed in a press molding apparatus, according to claim 2, wherein
    the drop preventing holding portions are disposed above the projecting portions, respectively, to prevent the rotary member from dropping from the main body if the main body and the rotary member are turned over.

4. A rotating structure of a rotary member having a predetermined width and being disposed in a press molding apparatus, according to claim 1, wherein
    the drop preventing holding portions are disposed above the projecting portions, respectively, to prevent the rotary member from dropping from the main body if the main body and the rotary member are turned over.

5. A press molding apparatus structure comprising:
    a main body having a width;
    a rotary member mounted on said main body and having a width; and
    at least one rotating block operably mounted between said main body and said rotary member to rotatably mount said rotary member to said main body for rotation about a rotation axis that extends in the width direction;
    wherein said at least one rotating block includes a convex strip attached to a lower portion of the rotary member and a concave strip attached to the main body;
    wherein the concave strip includes a flat mounting portion mounted to said main body and a concave sliding portion, and is formed with bolt holes penetrating through the mounting portion and the concave sliding portion at a plurality of positions;
    wherein the convex strip includes a flat mounting portion mounted to said rotary member and a convex sliding portion slidably mounted on said concave sliding portion of said concave strip such that the convex strip and said rotary member are rotatably slidable relative to said concave strip and said main body, said convex strip being formed with bolt holes penetrating through the mounting portion of the convex strip and the convex sliding portion at a plurality of positions;
    wherein projecting portions are mounted at both ends of the rotary member in the width direction at positions below said rotation axis; and
    wherein arcuate shaped drop preventing holding portions are mounted to the main body and disposed to engage the projecting portions, the arcuate shaped drop preventing holding portions each having an arcuate shape corresponding in shape to a trajectory of rotation of the rotary member relative to the main body so that edge portions of the projecting portions move along edge portions of the drop preventing holding portions in association with the rotation of the rotary member.

6. A press molding apparatus structure, according to claim 5, wherein
    the concave sliding portion of the concave strip has a cylindrical concave shape; and
    the convex sliding portion of the convex strip has a cylindrical convex shape.

7. A press molding apparatus structure, according to claim 6, wherein
    said at least one rotating block comprises a pair of rotating blocks mounted between said main body and said rotary member at opposite end portions thereof in the width direction.

8. A press molding apparatus structure, according to claim 6, wherein
    said at least one rotating block comprises a plurality of rotating blocks mounted between said main body and said rotary member at spaced apart locations in the width direction.

9. A press molding apparatus structure, according to claim 5, wherein
    said at least one rotating block comprises a pair of rotating blocks mounted between said main body and said rotary member at opposite end portions thereof in the width direction.

10. A press molding apparatus structure, according to claim 5, wherein
    said at least one rotating block comprises a plurality of rotating blocks mounted between said main body and said rotary member at spaced apart locations in the width direction.

11. A press molding apparatus structure, according to claim 10, wherein the drop preventing holding portions are disposed above the projecting portions, respectively, to prevent the rotary member from dropping from the main body if the main body and the rotary member are turned over.

12. A press molding apparatus structure, according to claim 9, wherein the drop preventing holding portions are disposed above the projecting portions, respectively, to prevent the rotary member from dropping from the main body if the main body and the rotary member are turned over.

13. A press molding apparatus structure, according to claim 8, wherein the drop preventing holding portions are disposed above the projecting portions, respectively, to prevent the rotary member from dropping from the main body if the main body and the rotary member are turned over.

14. A press molding apparatus structure, according to claim 7, wherein the drop preventing holding portions are disposed above the projecting portions, respectively, to prevent the rotary member from dropping from the main body if the main body and the rotary member are turned over.

15. A press molding apparatus structure, according to claim 6, wherein the drop preventing holding portions are disposed above the projecting portions, respectively, to prevent the rotary member from dropping from the main body if the main body and the rotary member are turned over.

16. A press molding apparatus structure, according to claim 5, wherein the drop preventing holding portions are disposed above the projecting portions, respectively, to prevent the rotary member from dropping from the main body if the main body and the rotary member are turned over.

\* \* \* \* \*